Figure 1:
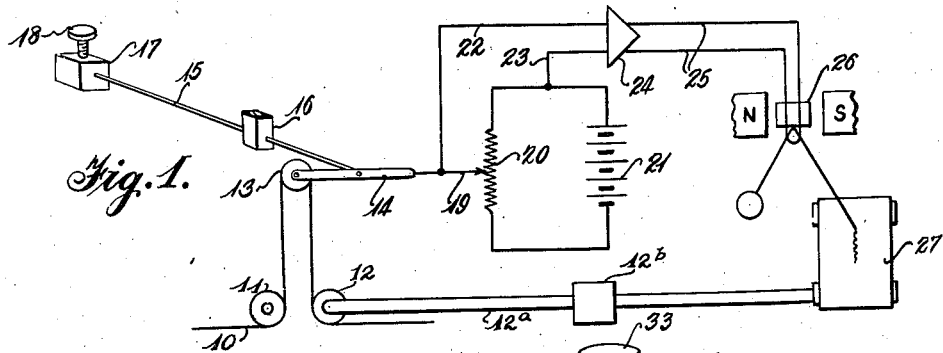

May 26, 1942.  F. B. BREAZEALE  2,284,364
TENSIOMETER
Filed March 7, 1940  2 Sheets-Sheet 1

Inventor
Francis B. Breazeale
By Albin F. Knight
Attorney

May 26, 1942.   F. B. BREAZEALE   2,284,364
TENSIOMETER
Filed March 7, 1940   2 Sheets—Sheet 2

Inventor
Francis B. Breazeale
By Albin F. Knight
Attorney

Patented May 26, 1942

2,284,364

UNITED STATES PATENT OFFICE 2,284,364

TENSIOMETER

Francis B. Breazeale, Enka, N. C., assignor to American Enka Corporation, Enka, N. C., a corporation of Delaware Application March 7, 1940, Serial No. 322,824

2 Claims. (Cl. 265—1.6)

This invention relates to the measurement of thread tension and particularly to an improved apparatus that is capable of measuring the tension of thread and recording this measurement while the thread is passing the measuring device at a very rapid rate.

Particularly in industries such as the artificial silk industry in which enormous quantities of filaments or threads are continuously produced and very rapidly handled, it is highly desirable, as a matter of quality control, to be able to measure such physical constants as the tension to which thread is subjected at various stages of the operation with sufficient rapidity so that the measuring causes no delay in the process. Various mechanical devices for measuring thread tension have been proposed but these devices almost invariably lack sensitivity and contain so many moving parts and parts of such weight that their inertia causes them to completely miss many sudden variations in tension and to follow only general variations over prolonged periods of time which detect neither flaws in the thread nor certain types of improper functioning of the machinery.

The present invention has for its object the provision of a thread tension recorder that will operate accurately and at sufficiently high speeds so that it will detect flaws in the thread and even the most minor of misfunctionings of the machinery. For this purpose the present invention provides a simple efficient device in which the tension of the thread is applied against the torque in a wire held under torsion and the balance between these two forces is indicated by the position of a very light weight slider on a resistance. The position of this slider on a resistance governs the operations of an oscillograph recorder of any desired type, as for example, a combination of cathode ray oscillograph and a camera or a recording galvanometer.

The drawings appended to this application illustrate the preferred embodiment of this invention and a study of these drawings and the following description of them will yield a better understanding of the principles and details and advantages of this invention. However, it is to be understood that the invention is not limited to the preferred embodiments shown and that the principles of this invention may be applied in any way and with any modification consistent with the claims of this application.

Figure 2:
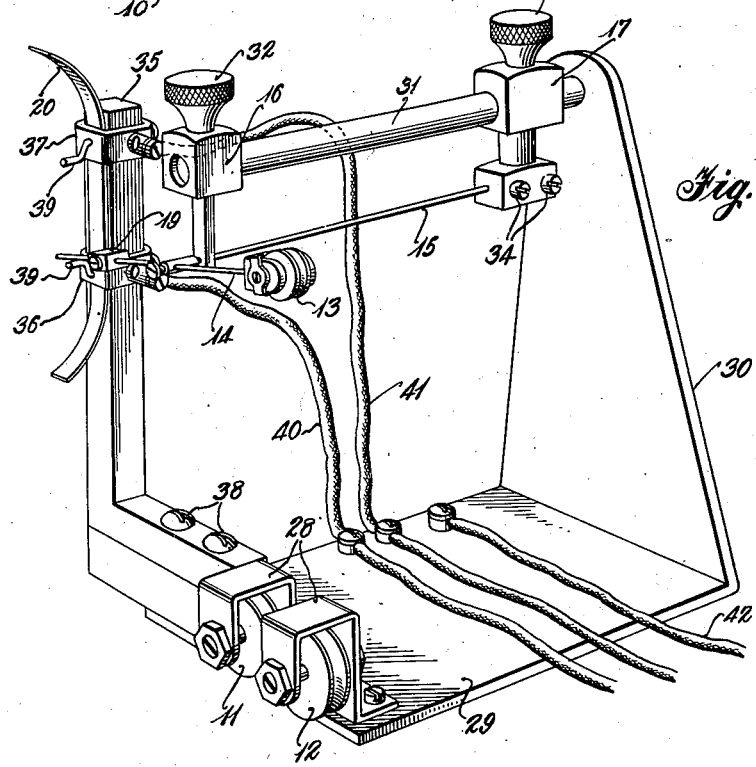
Figure 3:
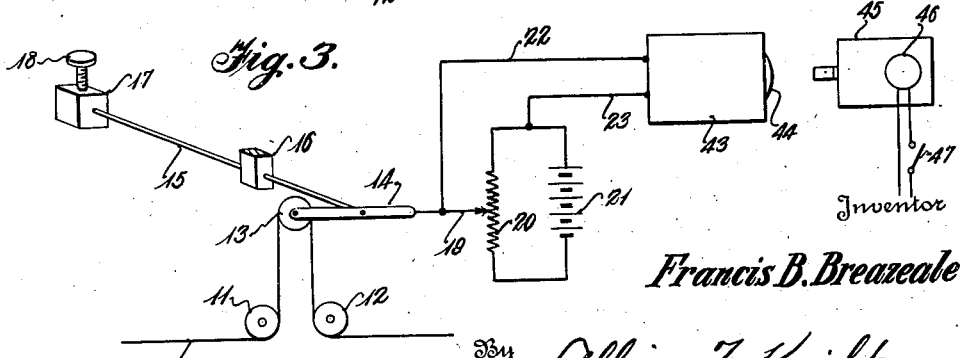
Figure 4:
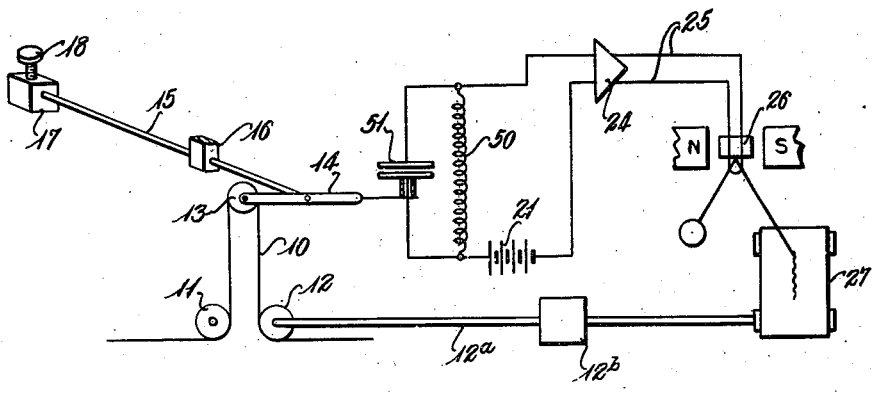
Figure 5:
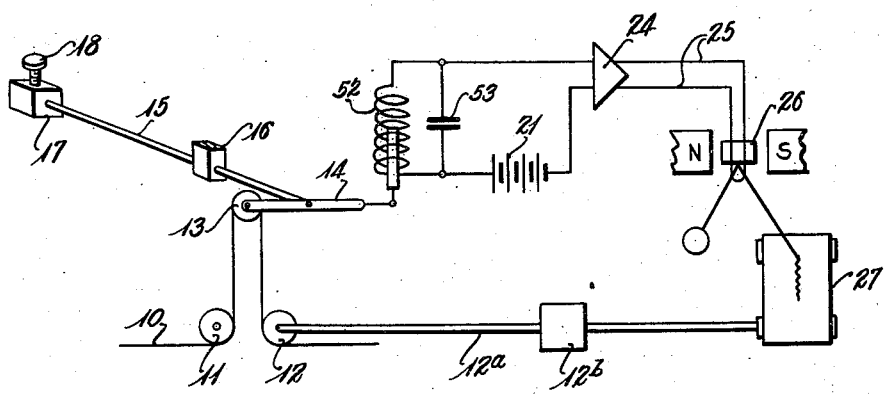

In the drawings:

Figure 1 is a diagrammatic illustration of the present invention and applied in a relatively simple form. Figure 2 is a perspective view of the measuring instrument itself. Figure 3 is a diagrammatic illustration of the device as it may be used employing a cathode ray tube and a camera for recording the results. Figure 4 is a diagrammatic illustration of the present invention showing use of a variable capacitance in the electrical circuit and Figure 5 is a similar illustration wherein the variable capacitance is replaced by a variable inductance.

As illustrated in Figure 1 the thread 10 to be measured for tension passes around a pair of fixed rollers 11 and 12 and over a movable roller 13 carried on a light weight lever 14 fixed to and carried by a torsion wire 15. The torsion wire 15 itself is carried in fixed blocks 16 and 17, the block 16 being near the end of the torsion wire that carries the lever 14 and the torsion wire being rotatable in this block. The block 17, on the other hand, is further removed from the lever 14 and the wire 15 is fixed to this block by a set screw 18 so that it cannot turn. Thus when tension is applied to the thread 10 it exerts a force on the pulley 13 which tends to revolve the lever 14 and twist the wire 15 between the lever 14 and the block 17 in which it is fixed against rotation. By reason of the low moments of inertia of the moving parts the device quickly reaches the point of equilibrium where the rotating force exerted by the thread on the wire 15 exactly balances the force exerted by the wire in attempting to restore itself to its normal position.

In order to record the position of the lever 14 when this position of equilibrium is reached, a light weight slider or contactor 19 is affixed to the lever 14 and arranged to move along a resistance 20. A battery 21 or similar source of potential may be applied across the resistor 20 and an amplifier may have its input connected by connections 22 and 23 to the slider 19 and one terminal of the battery 21 so that the voltage to the input of the amplifier 24 will be varied as the position of the lever 14 is varied. From the amplifier 24 the current passes through leads 25 to a recording galvanometer 26, where the measurements are recorded on a record strip or tape 27.

The recording tape of the galvanometer may be driven at a constant rate or may be driven through a gearing arrangement from the same power source that drives the thread 10. For this purpose a shaft 12a is provided, connected to the roller 12 and adapted to drive the record strip of the recording galvanometer 27 through the gear box 12b substantially as illustrated. In this latter case a close correlation can be made between the tension recorded and the particular length of thread that was passing under the tensioning device when the recording was made.

The specific device that applicant has constructed and found highly desirable as a tension measuring device is illustrated in greater detail in Figure 2 of the drawings. It comprises essentially the same elements as have been described in connection with Figure 1. In this device the fixed pulleys 11 and 12 are mounted in brackets 28 which in turn are carried by a main frame 29. From an upstanding ear 30 on the main frame 29 there extends a fixed horizontal bar 31 on which the torsion wire holding blocks 16 and 17 are movably mounted by means of set screws 32 and 33. Smaller set screws 34 hold the torsion wire 15 in the block 17 which is remote from the light torsion lever 14 and the wire 15 is rotatably held in the block 16 by passing it through a small opening in this block. The movable pulley 13 is mounted on the end of the torsion bar 14 as before and the torsion lever 14 is fixed to the end of the torsion wire 15 and extends on past the torsion wire and against the resistance 20 which is held to a non-conducting arm 35 by means of clamps 36 and 37. The non-conducting arm 35 is bolted on to the base plate 29 by screws 38. Each of the resistance holding clamps 36 and 37 carries clamping screw 39 which can be manually released so that the clamps 36 and 37 can be moved closer together or further apart to adjust the sensitivity and range of the testing device.

The clamps 36 and 37 are connected to the opposite ends of a source of potential, not shown in Figure 2 but shown as battery 21 in Figure 1, by means of conductors 40 and 41. The pivoted lever 14 and hence the slider 19 is connected through the torsion wire at the blocks 16 and 17 back to the frame and the connection 42 conveys this potential to the amplifier 24 or whatever recording equipment is used.

In Figure 3 is diagrammatically illustrated the particular recording arrangement that has been actually used by the applicant and in this arrangement the tension measuring part of the device is the same as that shown in Figure 2. The device differs, however, in that the leads 22 and 23 instead of being carried to a separate amplifier are connected directly to a cathode ray oscillograph 43 so that the measurements being made are constantly visible on the window of the cathode ray tube 44. In order to record these measurements a moving picture camera 45 is provided and focused on the cathode ray tube 44. This motion picture camera is driven by motor 46 which in turn is supplied with power from any suitable source, which has not been shown. A switch 47 is provided in the circuit, however, to stop the moving picture camera whenever the operation of the device is to be stopped. The switch 47 may be arranged to be thrown automatically when the progress of the thread through the machine stops. The shutter and step by step film advancing mechanism of the camera may be omitted so that a continuous trace of the action of the cathode ray tube is made rather than a series of separate pictures.

In Figure 4 a recording arrangement is illustrated similar to that shown in Figure 1 with the exception that the variable resistor 20 is replaced in the electrical circuit by the combination of a fixed inductance 50 and a variable capacitance 51. One plate of the capacitor 51 is relatively movable and is mechanically coupled to the lever 14 whereby movement of the lever is reflected in change of value of the capacitor. The inductance 50 is connected in parallel circuit with the capacitor and the combination is connected in series circuit with the potential source 21 in a manner such that a signal is transmitted to the amplifier 24 when the value of the capacitor is altered by movement of the lever 14 as above mentioned. The other elements of the device function in the same manner as the correspondingly numbered elements of Figure 1. An advantage of replacing the variable resistor with a variable capacitance in the device according to this invention is that frictional energy losses due to rubbing of the slider 19 against the body of the resistor 20 are eliminated thereby increasing the sensitivity and accuracy of the instrument.

In Figure 5 another modification of the basic arrangement to Figure 1 is illustrated wherein the variable resistor 20 is replaced with the combination of a variable inductance 52 and a fixed capacitor 53. The combination, the elements of which are connected in parallel circuit, is connected in series circuit with the potential source 21 and the amplifier 24 in a manner such that a signal is transmitted to the amplifier when the value of the inductance 52 is altered by movement of the lever 14. The other elements of the device function in a manner similar to that described in connection with Figure 1. An advantage arising from replacing the variable resistor with a variable inductance, as in the use of a variable capacitor, is the elimination of the frictional losses due to rubbing of the slider against the resistor.

In a device that has actually been used all of the wheels are of aluminum and mounted on jewel bearings. The tension on the wire 15 may be adjusted by loosening the screw 18 and the sensitivity and range of the device may be adjusted by moving the clamps 36 and 37. The resistance of the strip is usually about $2 \times 10^4$ ohms $\times$ centimeters. By moving the clamps 36 and 37 closer together the tension range of the instrument is decreased, but the sensitivity is increased because the voltage change is greater for any given movement of the arm. It has been found possible to make the total weight of the pivoted lever as low as about 7 grams and the frictional resistance of the slider against the resistor as low as around 0.1 to 0.2 gram. By adjusting the length of the torsion wire employed and the torsion placed upon it the period of natural vibration of the lever arm can be adjusted so as not to interfere with accurate recording.

Numerous modifications will immediately be apparent to those skilled in the art and it is not intended that the description of the preferred embodiment be construed as limiting the possible applications of this invention.

I claim:

1. A device for measuring the tension of moving threads, filaments or the like that comprises a substantially straight, rod-like, torsion element, means for anchoring the torsion element at one point in its length, means for directly supporting said element, free for rotation, at another point in its length, a lever arm attached to and extending laterally from said torsion element at a point removed from the anchoring means, means supported by and directly mounted on said lever arm for guiding a moving thread, filament or the like, means in the same plane as the first mentioned guiding means for guiding a moving thread, filament or the like over said first mentioned guiding means in such a manner that the tension of the thread, filament or the like will tend to rotate the supporting lever arm about the axis of the torsion element, and means to determine the extent of rotation caused thereby.

2. A device for measuring the tension of moving threads, filaments or the like that comprises a substantially straight, rod-like, torsion element, means for anchoring the torsion element at one point in its length, means for directly supporting said element, free for rotation, at another point in its length, a lever arm attached to and extending laterally from said torsion element at a point removed from the anchoring means, means supported by and directly mounted on said lever arm for guiding a moving thread, filament or the like, means in the same plane as the first mentioned guiding means for guiding a moving thread, filament or the like over said first mentioned guiding means in such a manner that the tension of the thread, filament or the like will tend to rotate the supporting lever arm about the axis of the torsion element, and electrical means to determine the extent of rotation caused thereby.

FRANCIS B. BREAZEALE.